United States Patent
Adjakple et al.

(10) Patent No.: US 9,549,370 B2
(45) Date of Patent: Jan. 17, 2017

(54) HOME NODE IDENTIFICATION, INTERFERENCE REDUCTION, AND ENERGY SAVINGS

(75) Inventors: Pascal M. Adjakple, Great Neck, NY (US); Mahmoud Watfa, Saint Leonard (CA); Ulises Olvera-Hernandez, Kirkland (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 183 days.

(21) Appl. No.: 13/097,825

(22) Filed: Apr. 29, 2011

(65) Prior Publication Data

US 2012/0106349 A1 May 3, 2012

Related U.S. Application Data

(60) Provisional application No. 61/329,882, filed on Apr. 30, 2010.

(51) Int. Cl.
*G01R 31/08* (2006.01)
*H04W 52/02* (2009.01)
(Continued)

(52) U.S. Cl.
CPC ............ *H04W 52/0206* (2013.01); *G06F 1/32* (2013.01); *H04W 36/22* (2013.01);
(Continued)

(58) Field of Classification Search
CPC .. H04W 24/10; H04W 72/082; H04W 84/045; H04W 36/22; H04W 52/0206; H04W 52/0212; H04W 52/0235; G06F 1/32
See application file for complete search history.

(56) References Cited

U.S. PATENT DOCUMENTS 6,584,330 B1 * 6/2003 Ruuska ..................... 455/574
7,542,437 B1    6/2009 Redi et al.
(Continued)

FOREIGN PATENT DOCUMENTS

CN    1409518 A    4/2003
CN    1516930 A    7/2004
(Continued)

OTHER PUBLICATIONS

3rd Generation Partnership Project (3GPP), R3-081174, "Solution for interference reduction SON use case", Orange, Alcatel-Lucent, 3GPP TSG-RAN WG3 #61bis, R3-081174, Kansas City, United States, May 5-9, 2008, 6 pages.
(Continued)

*Primary Examiner* — David Oveissi
(74) *Attorney, Agent, or Firm* — Condo Roccia Koptiw LLP

(57) ABSTRACT

Systems and methods for reducing interference and saving power for home Node Bs are disclosed. Home Node Bs can be configured to remain in sleep mode until needed based on various criteria, periodically operating transmit and receive components in order to detect mobile devices that may need the services of the home Node B. Mobile devices can indicate one or several target home Node Bs using one or more node identifiers within a proximity indication message. Closed subscriber group identifiers and membership data may also be included in a proximity indication message. Node or cell identities, along with membership data, may be stored in a fingerprint database or white-list on a mobile device.

15 Claims, 8 Drawing Sheets

(51) Int. Cl.
*H04W 36/22* (2009.01)
*G06F 1/32* (2006.01)
*H04W 84/04* (2009.01)

(52) U.S. Cl.
CPC ... *H04W 52/0212* (2013.01); *H04W 52/0235* (2013.01); *H04W 84/045* (2013.01); *Y02B 60/50* (2013.01)

(56) References Cited

U.S. PATENT DOCUMENTS

| | | | |
|---|---|---|---|
| 2003/0017837 A1 | 1/2003 | Kalliojarvi | |
| 2003/0050037 A1 | 3/2003 | Goedicke et al. | |
| 2007/0027510 A1 | 2/2007 | Rodrigues et al. | |
| 2009/0252073 A1* | 10/2009 | Kim et al. | 370/311 |
| 2010/0027510 A1* | 2/2010 | Balasubramanian et al. | 370/332 |
| 2010/0029290 A1* | 2/2010 | Barbaresi | H04L 67/322 455/450 |
| 2010/0111047 A1* | 5/2010 | Yang et al. | 370/336 |
| 2010/0323693 A1* | 12/2010 | Krishnamurthy et al. | 455/434 |
| 2011/0044284 A1 | 2/2011 | Voltolina et al. | |
| 2011/0053597 A1* | 3/2011 | Lee | H04W 36/22 455/436 |
| 2011/0098041 A1 | 4/2011 | Tomita et al. | |
| 2011/0105132 A1* | 5/2011 | Vasudevan | H04W 48/16 455/448 |
| 2011/0170466 A1 | 7/2011 | Kwun | |
| 2011/0244870 A1 | 10/2011 | Lee | |

FOREIGN PATENT DOCUMENTS

| | | |
|---|---|---|
| JP | 2012-512591 A | 5/2012 |
| JP | 2013-502820 A | 1/2013 |
| JP | 2013-510508 A | 3/2013 |
| JP | 2013516884 A | 5/2013 |
| KR | 10-2011-0081661 A | 7/2011 |
| WO | WO 02/07464 A1 | 1/2002 |
| WO | WO 2002/07464 A1 | 1/2002 |
| WO | WO 2009/115554 A1 | 9/2009 |
| WO | WO 2009/126219 A2 | 10/2009 |
| WO | WO 2010/002991 A1 | 1/2010 |
| WO | WO 2010/004639 A1 | 1/2010 |
| WO | WO 2011/083947 A2 | 7/2011 |

OTHER PUBLICATIONS

NTT Docomo, Inc., "Cell identity reporting in proximity indication", Tdoc R2-100517, 3GPP TSG-RAN WG2 #68bis, Valencia, Spain, Jan. 18-22, 2010, 5 pages.

Kyocera, "Proximity Indication for energy saving", R2-101513, 3GPP TSG-RAN WG2 #69, San Francisco, USA, Feb. 22-26, 2010, 4 pages.

NTT Docomo, Inc., "Cell identity reporting in proximity indication", Tdoc R2-101548, 3GPP TSG-RAN WG2 #69, San Francisco, USA, Feb. 22-26, 2010, 4 pages.

3rd Generation Partnership Project (3GPP), R3-101470, "Proposals for Energy Saving Mechanism", Samsung, 3GPP TSG RAN WG3 Meeting #68, Montreal, Canada, May 10-14, 2010, 4 pages.

3rd Generation Partnership Project (3GPP), R3-103299, "BS probing approach for energy saving wake up in hotspot deployments", TNO, KPN B.V., 3GPP TSG RAN WG3 Meeting #70, Jacksonville, Florida, USA, Nov. 15-19, 2010, 4 pages.

* cited by examiner

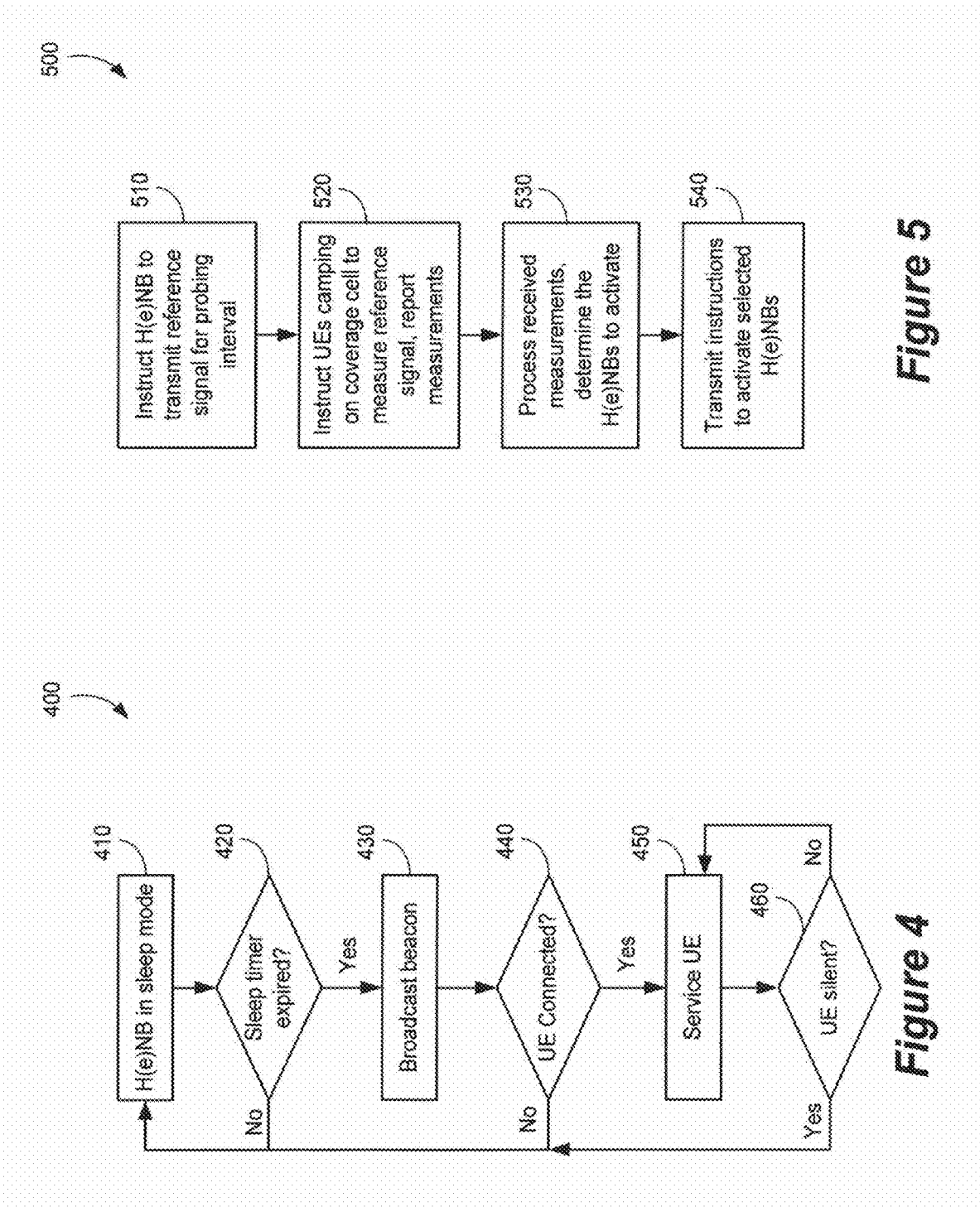

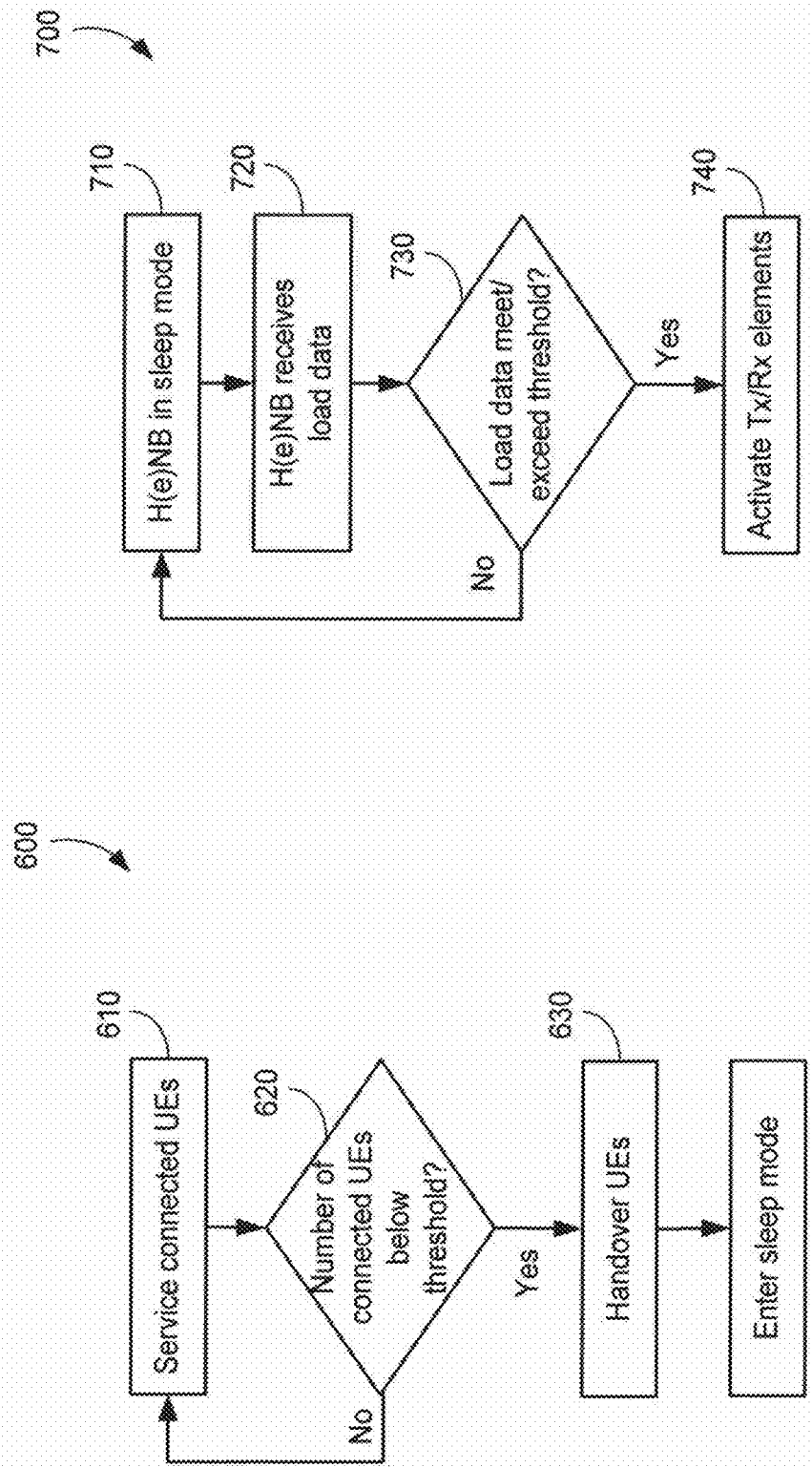

HOME NODE IDENTIFICATION, INTERFERENCE REDUCTION, AND ENERGY SAVINGS

CROSS-REFERENCE TO RELATED APPLICATIONS

This application claims the benefit of U.S. Provisional Application No. 61/329,882, filed Apr. 30, 2010, the contents of which are hereby incorporated by reference herein.

BACKGROUND

The Third Generation Partnership Project (3 GPP) Long Term Evolution (LTE) standards provide specifications for high performance air interfaces for cellular mobile communication systems. LTE specifications are based on Global System for Mobile Communications (GSM) specifications, and provide the upgrade path for 3 G networks to evolve into partially-compliant 4 G networks. LTE Advanced is an enhancement of the LTE standard that provides a fully-compliant 4 G upgrade path for LTE and 3 G networks. LTE provides for the use of femtocells, which may also be referred to as Home Node Bs, or Home eNode Bs (collectively referred to herein as H(e)NBs). H(e)NBs perform many of the functions of an LTE eNode B, but are optimized for use in a home or other smaller geographical area and designed to provide coverage over smaller areas than cells serviced by macro Node Bs in 3 G or LTE systems that service users in an LTE system. H(e)NBs may provide wireless communications connectivity for one or more mobile telecommunications devices, such as a mobile telephone, a smartphone, a personal data assistant (PDA), a wireless communications capable laptop, etc. Such devices may be referred to as user equipment, or UE.

SUMMARY

Systems, methods, and devices are disclosed that enable a home Node B to determine load information for at least one neighboring cell and determine that the load information corresponds to a load that is below a threshold. Responsive to determining that the load information corresponds to the load that is below the threshold, the home Node B enters into a sleep mode. A home Node B in a sleep mode may also determined that load information indicates that the home Node B should be in active mode, and in response, may enter an active mode. When a home Node B changes states, such as from active state to sleep mode or from sleep mode to an active state, the home Node B may notify neighboring cells of the state change. Such a home Node B may also determine that a sleep timer has expired and transmit a reference signal responsive to determining that the sleep timer has expired.

A home Node B may also receive an instruction to transmit a reference signal and, responsive to receiving the instruction, transmit the reference signal so that UEs may detect the reference signal. Such UEs may measure the reference signal and transmit the measurements to the network. The network may use such measurements to determine the particular home Node Bs to activate. The network may send an instruction to selected home Node Bs to activate, and such home Node Bs may activate responsive to receiving the instruction. Such an instruction may also be sent from nodes neighboring the home node B. Such nodes may determine to send such an instruction based on measured loads or other criteria. Home Node Bs may also receive an instruction to enter into the sleep mode and may enter sleep mode responsive to receiving such an instruction.

A wireless transmit and receive unit (WTRU) as disclosed may include a transceiver configured to receive an instruction to measure a reference signal associated with a home Node B, receive the reference signal, and transmit measurements of the reference signal. Such a WTRU may also include a processor configured to measure the reference signal. The transceiver of such a WTRU may be configured to communicate with the home Node B, and may be configured to receive an instruction to hand off from the home Node B to another node. These and other aspects of the present disclosure are set forth in more detail below.

BRIEF DESCRIPTION OF THE DRAWINGS

The following detailed description of disclosed embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 4 illustrates a non-limiting exemplary method of implementing one aspect of the present disclosure.

FIG. 5 illustrates another non-limiting exemplary method of implementing an aspect of the present disclosure.

FIG. 6 illustrates another non-limiting exemplary method of implementing an aspect of the present disclosure.

FIG. 7 illustrates another non-limiting exemplary method of implementing an aspect of the present disclosure.

DETAILED DESCRIPTION OF ILLUSTRATIVE EMBODIMENTS

Figure 1A:
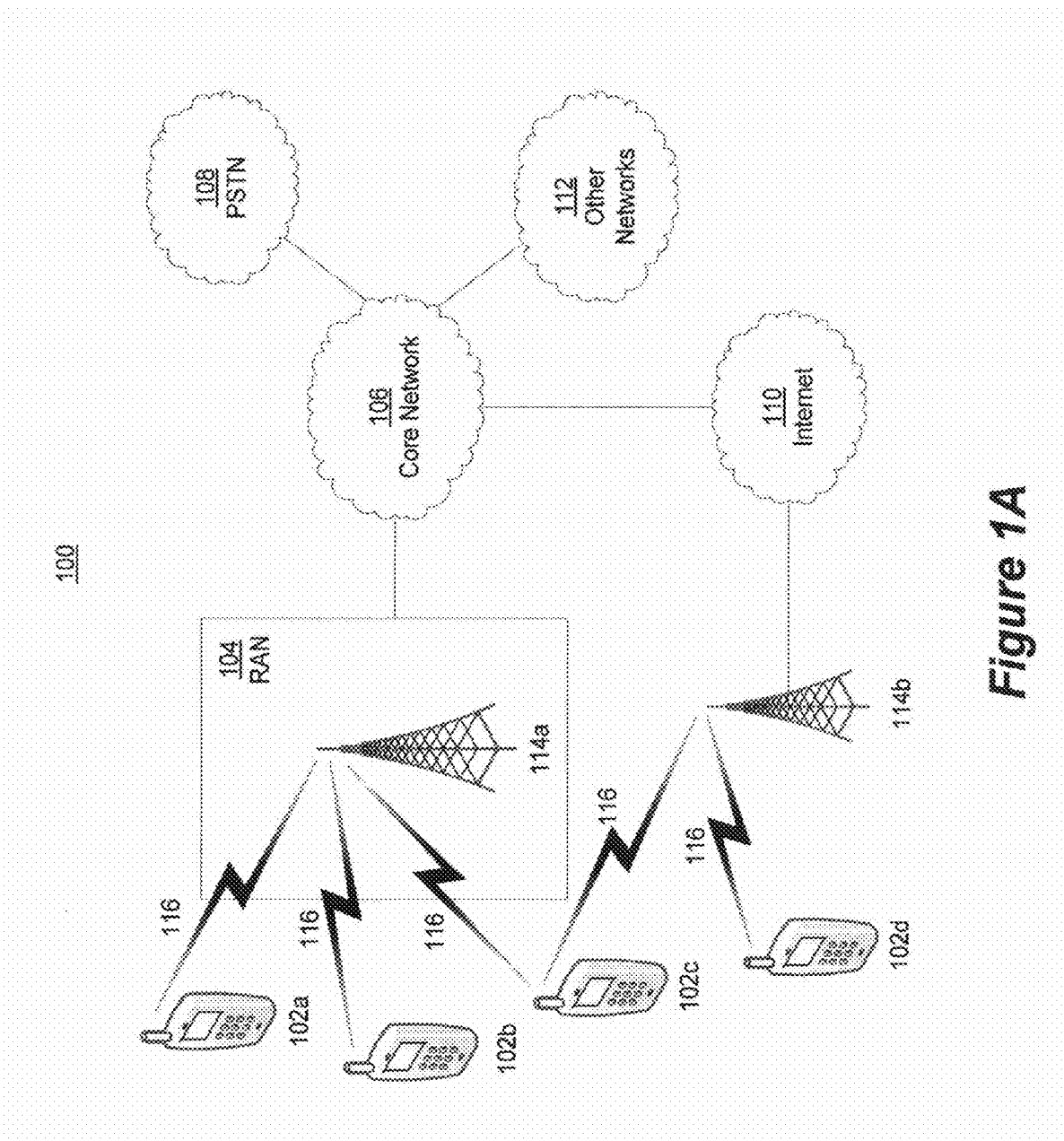
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell. Note that one or more base station transceivers may also be used for hard wired communication, for example, between base station 114a and core network 106. "Transceiver" as used herein may describe any component, device, system, and/or subsystem that may enable, facilitate or otherwise make communications (wired, wireless, or both) possible between two or more devices components, systems, and/or subsystems.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
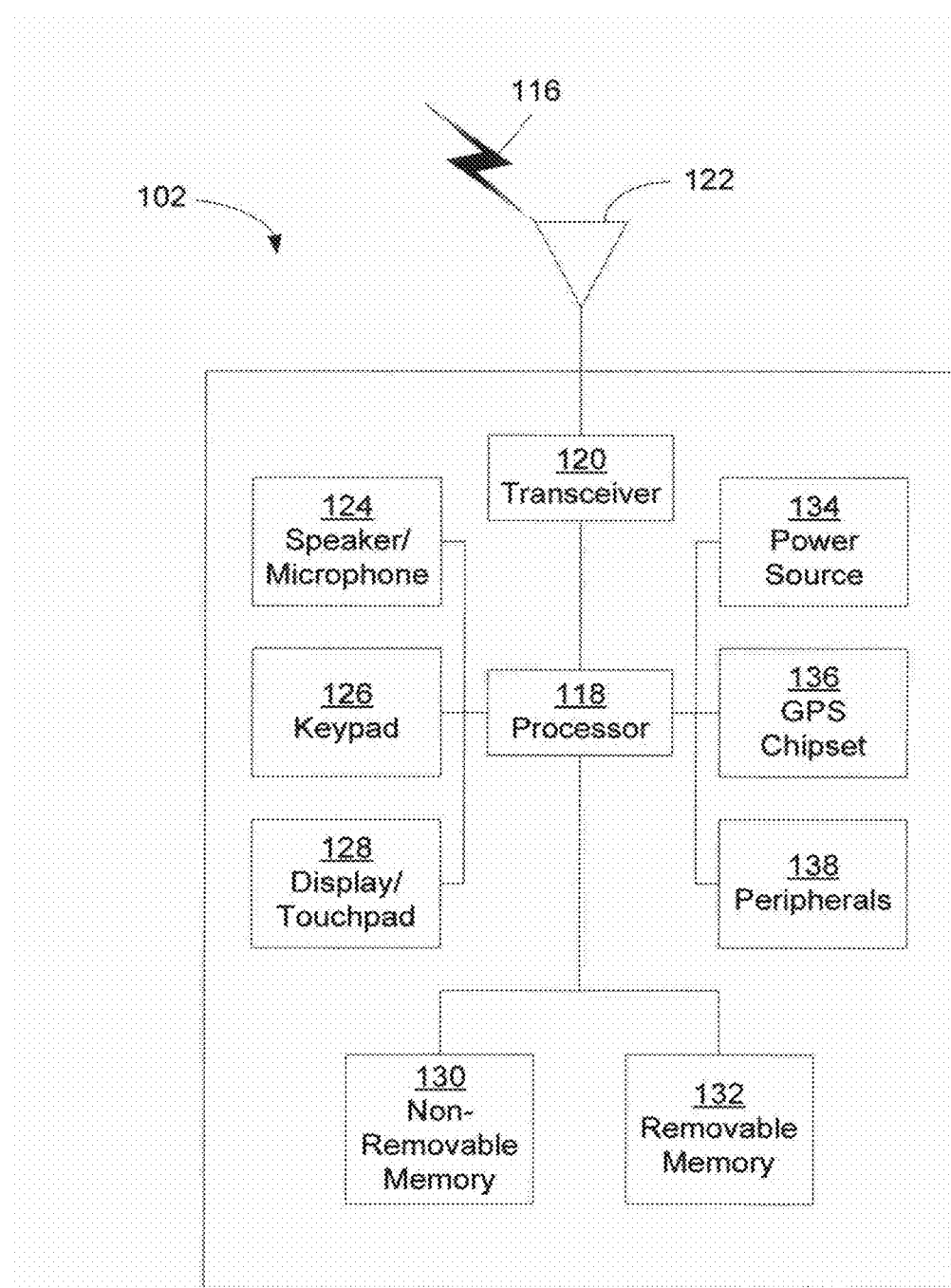
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
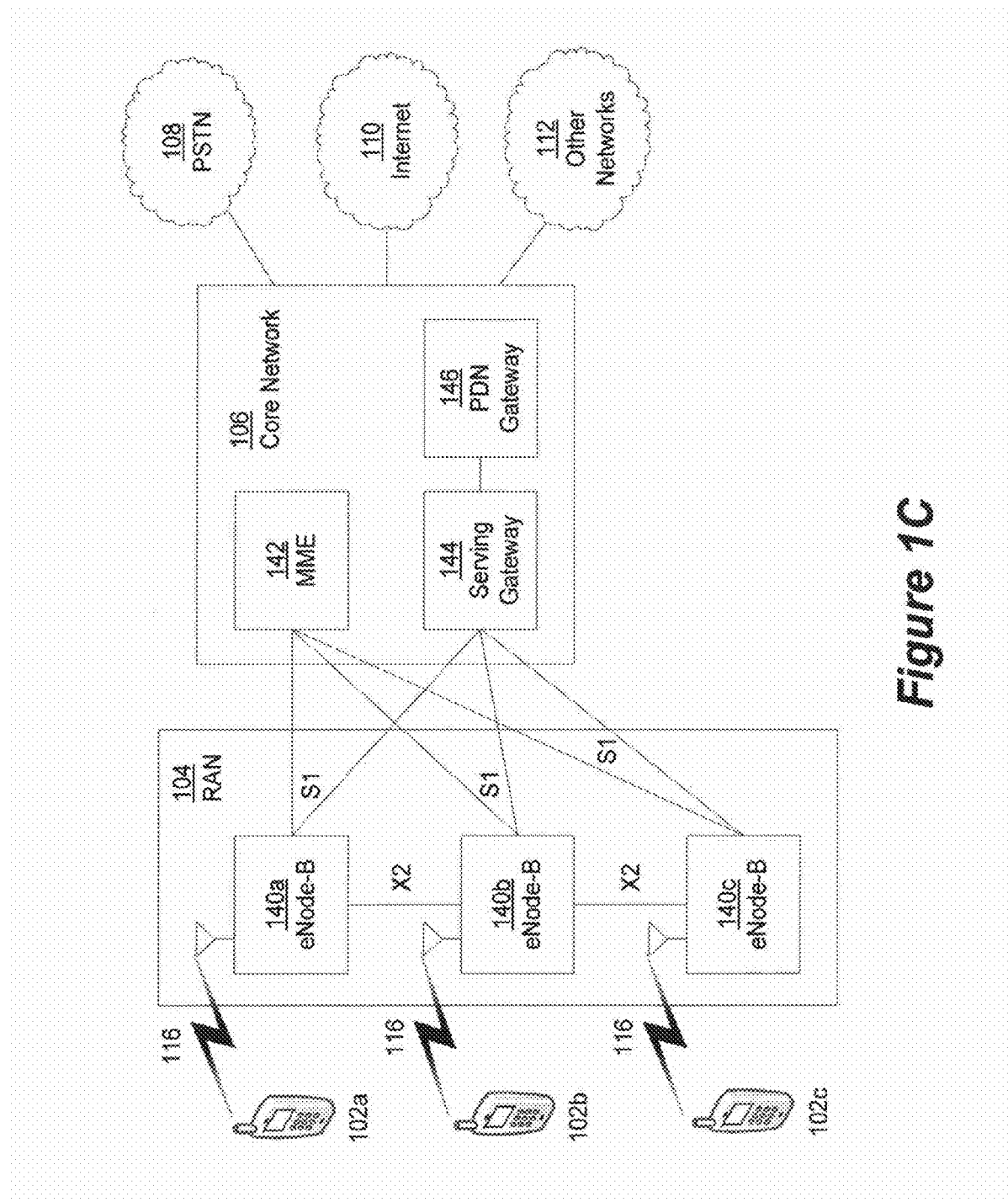
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Home node Bs (H(e)NBs) (alternatively known as home eNode Bs or "hotspots") may perform many of the functions of an LTE eNode B, but may be optimized for use in a home or other smaller geographical area and may be designed to provide coverage over smaller areas than cells serviced by macro Node Bs in 3 G or LTE systems that service users in an LTE system. H(e)NBs may provide wireless communications connectivity for one or more mobile telecommunications devices, such as a mobile telephone, a smartphone, a personal data assistant (PDA), a wireless communications capable laptop, etc. Such devices may be referred to as user equipment, or UE. While reference may be made throughout this disclosure to embodiments implemented using H(e)NBs or hotspots, any embodiment used herein may be applicable to any type of cell (e.g., servings cells, access points of any type, any type of base station, picocells, femtocells, eNodeBs, etc.), not just hotspots or types of node Bs. Embodiments of the present disclosure applied to any cell type or any multiple cells are contemplated as within the scope of the present disclosure.

While H(e)NBs may provide an effective and relatively inexpensive means of expanding an LTE system's coverage area and improving the quality of service for UEs, there may be challenges posed by a mass market deployment of H(e)NB cells. Each H(e)NB consumes energy and may also interfere with existing macro Node Bs and other H(e)NBs. Interference due to H(e)NBs may be a particularly serious concern where such nodes are deployed in an uncoordinated manner without taking into consideration the locations of existing Node Bs and other H(e)NBs. For example, individual businesses and residents of homes that desire the additional coverage and quality that an H(e)NB can offer may independently acquire and install H(e)NBs without coordinating with an LTE system operator. Therefore, those of skill in the art may desire a means of providing the advantages of an H(e)NB while reducing the potential for interference with other LTE elements and reducing the energy consumed by H(e)NBs and other elements of an LTE system that may interact with H(e)NBs.

Figure 2:
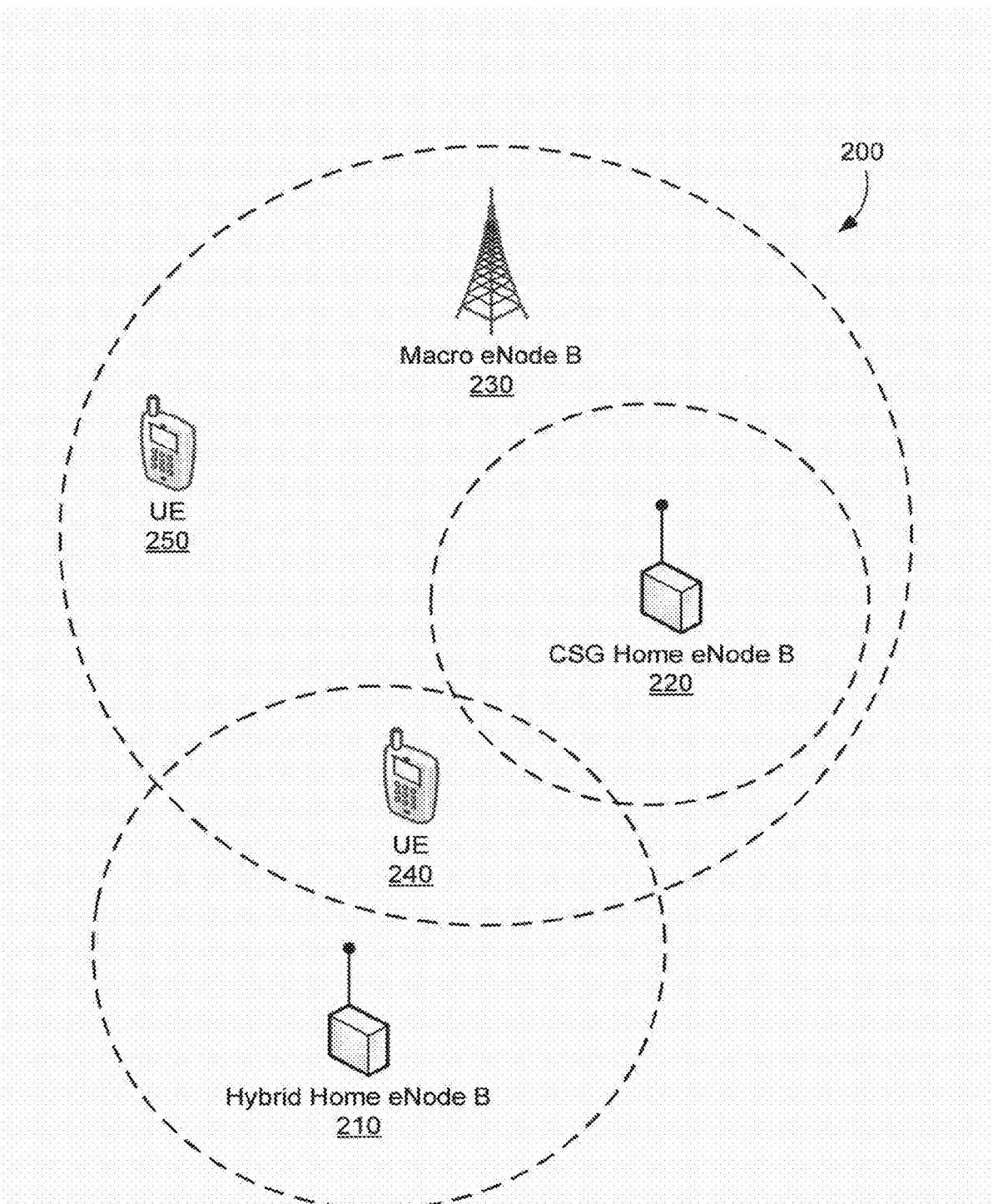
FIG. 2 illustrates a block diagram of a non-limiting exemplary LTE system that includes H(e)NBs.

FIG. 2 illustrates an exemplary LTE system 200 that may include a macro eNode B 230 and H(e)NBs 210 and 220. UEs 240 and 250 may be configured to communicate with one or more nodes of LTE system 200. As seen in FIG. 2, the coverage areas of H(e)NBs may overlap, or be completely within, the coverage area of a macro Node B. In some embodiments, H(e)NBs may be connected to macro Node Bs (which may be referred to as "serving Node Bs" of such H(e)NBs) via wired broadband connections, but in alternative embodiments, H(e)NBs may be connected to an LTE system using other means, including wireless. In some implementations, H(e)NBs 210 and 220 may interfere with macro eNode B 230 and/or each other. In order to reduce interference, and additionally save energy used to power H(e)NBs 210 and/or 220, H(e)NBs 210 and/or 220, or elements of H(e)NBs 210 and/or 220, may be powered off when not needed. For example, it may be desirable to power down an H(e)NB and/or elements of an H(e)NB when no member UEs are communicating with the H(e)NB.

Figure 3:
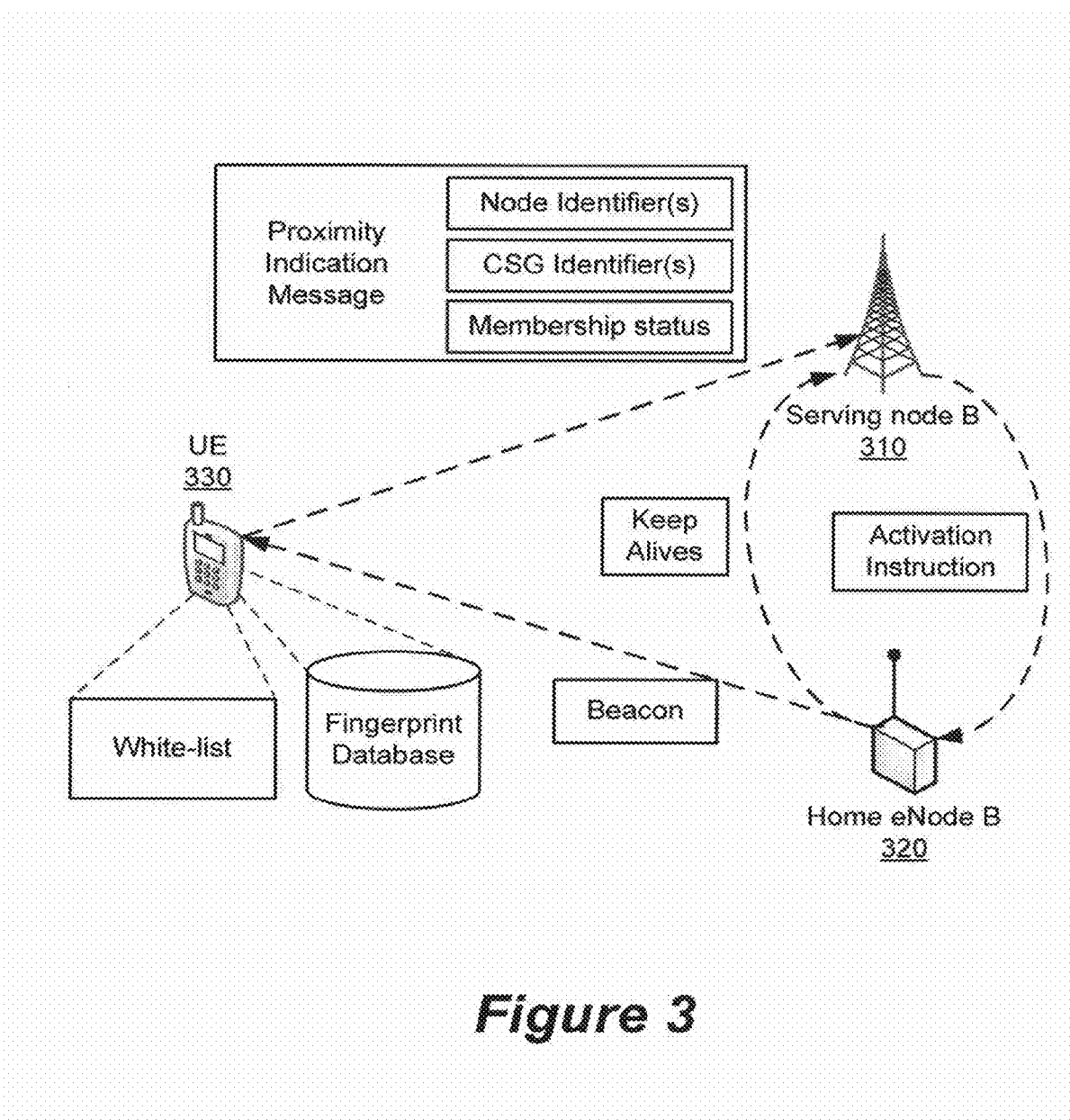
FIG. 3 illustrates a block diagram of several devices in a non-limiting exemplary LTE system and the exchange of exemplary messages.

FIG. 3 illustrates several exemplary devices that may be used in an LTE system and several exemplary messages and components. H(e)NB 320 may connect to a serving Node B, such as serving node 310, which may also be a macro Node B in a service provider's network. H(e)NB 320 may connect to serving node 310 via a wired or wireless broadband connection, and may provide wireless communications connectivity for one or more UEs. H(e)NB 320 may be configured to allow certain UEs to communicate with the H(e)NB, or to prioritize service for certain UEs. Such devices may be referred to as member UEs of an H(e)NB.

In some embodiments, a UE, such as UE 330, may maintain a "white-list" of frequencies and cells that the UE may consider for communications use. Such lists may also be maintained in an LTE system so that the LTE network devices are also aware of the contents of any white-list maintained by UEs in that system. In such embodiments, a proximity indication message may be transmitted by a UE to a node of a cell in the white-list that includes a cell global identifier (CGI) of the cell. Alternatively, any other cell or node identifier or identifying data derived from a white-list or via any other means may be transmitted by a UE to a node of a cell. Such identifiers may include identifiers associated with H(e)NBs, and may be sent to H(e)NBs as part of a proximity indication message transmitted by a UE. Such identifiers may serve as a means to trigger the identified H(e)NB (or elements thereof) to power up. In such scenarios, an H(e)NB may be configured to automatically power down entirely, or power down one or more elements thereof, when no member UEs are communicating with the H(e)NB. By powering down when not in use, energy expenses of an H(e)NB may be reduced, as may be the interference generated by the H(e)NB for macro Node Bs or other H(e)NBs.

In other embodiments, a UE may transition into connected mode after successfully establishing communication with a macro Node B and may transmit a proximity indication message to the macro Node B that includes an identifier associated with an H(e)NB. The macro Node B may determine the target H(e)NB based on the data contained in the proximity indication message and may transmit an instruction to the target H(e)NB instructing the target H(e)NB to power up or otherwise become available for communications with the UE.

Alternatively, a serving Node B may determine that a UE is configured to operate with a H(e)NB within the proximity of the serving Node B. A serving Node B may have access to the white-list associated with a particular UE and may therefore determine whether any H(e)NB that is associated with the serving Node B is accessible by the UE. If so, the serving Node B, or devices communicatively connected to the serving Node B, may instruct the target H(e)NB to power up as needed. In this implementation, there may be no need for a UE to adjust its proximity indication message in order to communicate with an H(e)NB.

An H(e)NB may be configured to leave its receiver powered on, even when its transmitters are powered off while no UE is communicating with the H(e)NB. The H(e)NB may detect uplink signal transmissions (e.g., sounding signal) sent to serving Node Bs by its member UEs. In an inter-frequency scenario, the H(e)NB may be configured to monitor the frequency operated by the serving Node B and single out its member UEs from non-member UEs. When a member UE is detected, the H(e)NB may power up the elements necessary for communication with the member UE. In some implementations, an H(e)NB may detect its member UEs by detecting cell radio network temporary identifiers (C-RNTIs) associated with it member UEs in transmissions from UEs to a serving Node B.

Where no cell identifier is included in proximity indication messages, or even if a cell identifier is included in proximity indication messages, an H(e)NB may be configured for discontinuous transmission (DTX) and/or discontinuous reception (DRX) on the radio interface, or "Uu Interface", between a UE and the H(e)NB while the H(e)NB transmits and receives keep-alive traffic over the interface between the H(e)NB and the serving Node B. The interface between the H(e)NB and the serving Node B may be known as the "S1 interface". An example method 400 is illustrated in FIG. 4. An H(e)NB may be in a sleep mode (alternatively referred to as "dormant" mode) at block 410. At block 420, H(e)NB may determine whether a sleep timer has expired. If not, the H(e)NB returns to sleep mode at block 410.

If the sleep timer has expired, at block 430 the H(e)NB may wake up and broadcast over its synchronization and/or beacon channels. Such broadcasts may be transmitted for a set amount of time that may be referred to as a "probing" interval. Such a probing interval may be configurable by an administrator, user, network, or other means. A UE in idle mode in the vicinity of such an H(e)NB may detect the presence of the H(e)NB via the synchronization and/or beacon channels, and may camp on the H(e)NB if the H(e)NB meets the cell selection/re-selection criteria of the UE. At block 440, the H(e)NB may determine whether a UE has connected to the H(e)NB. If no UE connects to the H(e)NB during the probing interval, then the H(e)NB may return to sleep mode, or dormant mode, at block 410.

If a UE in the vicinity of the H(e)NB is in connected mode, the UE may detect the H(e)NB and report necessary measurements if configured to do so by the current serving Node B. The serving Node B may make the decision to handover the UE to the H(e)NB. If a UE is connected to the H(e)NB, at block 450 the H(e)NB may service the UE. If, at block 460, the H(e)NB determined that the UE has remained silent, e.g., for at least a predetermined amount of time, the H(e)NB may return to sleep mode at block 410. In order to avoid wasting power and creating unnecessary interference, the H(e)NB may be configured to detect when, for some configurable and/or predefined time, a detected UE does not initiate any traffic and/or signaling on the H(e)NB. In such cases, the H(e)NB may be configured to turn its transmitters off or otherwise power down its elements even though the H(e)NB has detected a UE. If the connected UE does initiate traffic or signaling, the H(e)NB may continue to service the UE at block 450.

Another example method 500 is illustrated in FIG. 5. At block 510, one or more inactive (i.e., dormant or sleeping) H(e)NBs may be instructed by the network, for example, by a neighbor cell or a serving cell such as a serving Node B, to transmit a pilot or reference signal (e.g., using synchronization and/or beacon channels) for a time interval (e.g., a probing interval.) For example, while an H(e)NB is in sleep mode, a camping UE may initiate radio resource control (RRC)/non-access stratum (NAS) signaling for the purpose of indicating its presence to the H(e)NB. For example, a UE may perform a location update even if no trigger for such an update occurs. Such a location update may initiate an instruction by the network instructing H(e)NBs to transmit a pilot or reference signal. Note that a reference signal may be unique or specific to a particular home Node B. After the probing interval, if no UE is detected or connects, such H(e)NBs may return to dormant, or sleep, mode.

During the probing interval, at block 520 the active and idle UEs camping on the coverage cell may be instructed by the coverage cell that currently covers such UEs to perform measurements on the reference signal from the probing H(e)NB and to report back such measurements to the network. At block 530, the network may process such measurements and determine which, if any, H(e)NBs to activate and which H(e)NBs that should remain dormant. At block 540, the network may instruct the H(e)NBs it has determined that should be active to activate. The remaining H(e)NBs may remain in dormant mode, until receiving instructions otherwise, or until a sleep timer expires. The now active H(e)NBs may connect with and service the UEs within their respective cells.

In an embodiment that may save power and avoid interference, example method 600 of which is illustrated in FIG. 6, if very few UEs connect to an H(e)NB during a configurable and/or predefined amount of time, the H(e)NB may handover these UEs to one or more neighboring cell and then go to sleep (power down one or more elements.) At block 610, an H(e)NB may be active and servicing connected UEs. At block 620, the H(e)NB may determine whether the number of connected UEs is below a threshold. If not, the H(e)NB may continue to service the connected UEs at block 610. If the number of connected UEs is below the threshold, at block 630, the H(e)NB may handover the UEs to another base station, for example, another H(e)NB, a serving node B, or any other type of base stations or network element. After handing over the UEs, at block 640 the H(e)NB may enter a dormant, or sleep, mode.

In an embodiment, an example method of which is illustrated in FIG. 7, load information may be periodically communicated to a sleeping H(e)NB by the network or an LTE system and used to determine whether the H(e)NB should become active. At block 710, an H(e)NB may be in dormant or sleep mode. At block 720, the H(e)NB may receive load data from the network or LTE system. The load data may include data about loads in a serving cell, other hotspots, including neighboring H(e)NBs), or load information for any other coverage area or detected on any other device. Load information may include a number of connected devices, a volume of traffic, a percentage of bandwidth consumed and/or available, or any other information that may be indicative of a use of resources in a network or device.

At block 730, the H(e)NB may determine whether such load information meets or exceeds one or more configurable and/or predefined thresholds. If so, the H(e)NB may activate its transmit and/or receive elements, or any other elements, at block 740 in order to assist with handling the current load. For example, if the number of UEs or the current data volume in an area is above a certain threshold, one or more H(e)NBs in the area may be configured to "awaken" in response to determining that this load information exceed a threshold and handle some of the traffic and data volume in the area. If, at block 730, the H(e)NB determined that the load data does not exceed any thresholds, it may return to sleep mode at block 710.

Figure 8:
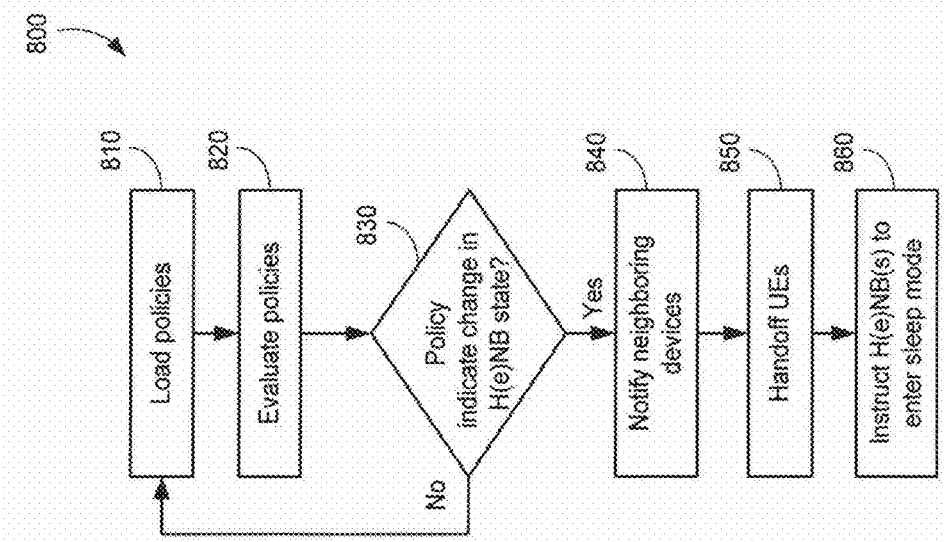
FIG. 8 illustrates another non-limiting exemplary method of implementing an aspect of the present disclosure.

Example method 800 is illustrated in FIG. 8. In this example, H(e)NBs may be activated by the network or an LTE system based on policies. Such policies may be configured on the network, at the H(e)NB, or both. At block 810, a node in the network may be loaded with one or more policies. Such policies may be signaled to the node from another network device or configured on the node by an administrator.

At block 820, the node may evaluate policies based on any criteria, including any information that may be received at the node, such as any load data as described herein, a current time or date, a current state or history of activity of any H(e)NB or any other network device, or any other data or instructions that may be received at a network device. For example, a policy may be configured on such a node that one or more particular H(e)NBs are to be activated during a particular time period each day. Alternatively, a policy may be configured on such a device that all or one or more particular H(e)NBs are to be activated after being in dormant mode for a set amount of time. In another alternative, a policy may be configured on such a device that all or one or more particular H(e)NBs are to be set to sleep mode after being active for a set amount of time. In another example, a determination may be made based on load information collected from neighboring device or cells, either within or across RATs. In another example, a determination may be made based on the capabilities of the cells or nodes. For example, a node may determine to place one node that overlaps another node in sleep mode, or may determine to keep active nodes that overlap where one node provides a different level of service from the other. Alternatively, UEs may be handed off from an E-UTRAN node to one or more UTRAN/GERAN nodes in an effort to save energy. The E-UTRAN node may then be placed in sleep mode. Any other policy using any other criteria or no criteria may be configured on a network device, and all such policies are contemplated as within the scope of the present disclosure.

At block 820, a determination may be made as to whether the policy or policies, given the current set of relevant criteria, require that any H(e)NBs change their states. If not, further policy evaluation may be performed at block 810.

If H(e)NB state change is needed according to one or more policies, at block 840, the node may notify other potentially affected nodes about the imminent change in one or more H(e)NBs' states. For example, if the policy requires that one or more H(e)NBs be placed into sleep mode, the node may notify nodes neighboring the soon-to-be dormant H(e)NBs(s) that the H(e)NB is going to be unavailable. Any neighboring devices may be notified, including inter-RAT and intra-RAT neighboring nodes.

At block 850, any UEs connected to a node that has been determined to be placed in sleep mode may be instructed to handoff to another node. At block 860, any node that has been determined to be deactivated may be instructed to go into sleep or dormant mode.

Figure 9:
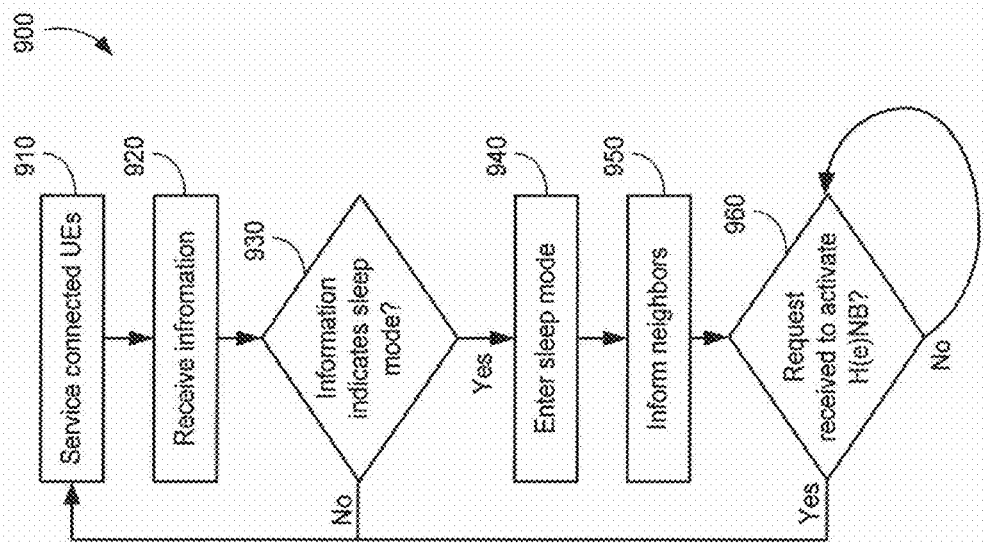
FIG. 9 illustrates another non-limiting exemplary method of implementing an aspect of the present disclosure.

Example method 900 is illustrated in FIG. 9. In this example, a hotspot, such as an H(e)NB, may autonomously enter sleep mode or dormant mode (i.e., without receiving explicit instructions to do so from the network or any other network device) based on information available. At block 910, an H(e)NB may be servicing connected UEs.

At block 920, the H(e)NB may receive and/or determine information that it may use to determine whether it should enter sleep mode. Such information may include any information that an H(e)NB may use to make such a decision, including load information for itself and for any other node, including neighboring nodes, the coverage cell within which the H(e)NB operates, serving cells, etc. At block 930, a determination may be made based on the information whether the H(e)NB should enter sleep mode or not. For example, if the load in the coverage cell is low or below a certain threshold, the H(e)NB may determine that it should be in sleep mode so that power savings can be realized since UEs will be adequately served by the coverage cell. Alternatively, if load in the coverage cell is high or above a certain threshold, the H(e)NB may determine that it should remain active so that UEs will be better served by it than by the coverage cell. Any other information may be used to determine whether the H(e)NB should remain active, and all such information is contemplated as within the scope of the present disclosure.

If it is determined at block 930 that the H(e)NB should remain active, the H(e)NB continues to service connected UEs at block 910. If it is determined that the UE should enter sleep mode, at block 940 the H(e)NB enters sleep mode. In some implementations the H(e)NB may take active steps to have the connected UEs handed off to another node or cell as well. At block 950, intra-RAT and inter-RAT neighbor nodes may be informed of the change of state of the H(e)NB.

In an embodiment, neighboring nodes may request that an H(e)NB become active, for example, to assist with handling a large traffic volume or number of UEs. Such a request may be made through a network device such as another node, in an embodiment, after some processing by such a node, or may be made directly to the H(e)NB by one or more other serving cells or nodes. At block 960, a determination may be made by the H(e)NB as to whether such a request has been received. If so, the H(e)NB may become active and begin serving UEs at block 910. If no such request has been received, the H(e)NB may remain in sleep mode until such a request has been received, or until such time that is determines it should become active, for example, according other embodiments disclosed herein. When the H(e)NB leaves dormant mode, it may again notify other cells and nodes about its state change as was done at block 950.

Proximity indication message may be used in some examples, referring again to FIG. 3. Where proximity indication messages are used and a cell identifier, such as a CGI, is to be included in such a proximity indication message, if a UE identifies several candidate H(e)NBs, the UE will need to be configured to determine which H(e)NB to identify in a proximity indication message. When a UE may be aware of multiple H(e)NBs in an area, the UE may be configured to transmit multiple proximity indication messages and include one identifier (such as a CGI) in each message. Identifiers included in the proximity indication messages sent from the one location or vicinity may be changed in each proximity indication message.

Alternatively, it may be desirable for a UE to identify multiple cells or nodes in a single proximity indication message. Accordingly, a UE may be configured to include identifiers for H(e)NBs in the UE's current location. In still another alternative, a UE may be configured to include identifiers for H(e)NBs of which the UE believe it is a member in a proximity indication message. Alternatively, a UE may prioritize H(e)NBs based on any criteria, and may be configured include in a proximity indication message an identifier of a highest priority H(e)NB. In such implementations, if two or more H(e)NBs are determined to be of equal priority, a UE may be configured to arbitrarily select one of the highest priority H(e)NBs.

Both hybrid H(e)NBs and closed subscriber group (CSG) H(e)NBs may be in use. Hybrid H(e)NBs may provide services to members and non-members while prioritizing members over non-members. CSG H(e)NBs may provide services to members. In such situations, there may be a need to take into account user preferences for CSG H(e)NBs and to specify rules for reporting CSG cells versus Hybrid cells. Where hybrid H(e)NBs are in use (such as hybrid H(e)NB 210 shown in FIG. 2), rules may be configured on a UE for reporting CSG and hybrid H(e)NBs. Such rules may be based on preferential charging priority, the status of which a UE may acquire through a preliminary access check before reporting the proximity indication with a node identifier. Alternatively, such rules may be based on interference mitigation priority or any other type or combination of priorities. The priorities used in such rules may be broken down to sub-priority levels. Any scheme using any type of combination of priorities is contemplated as within the scope of the present disclosure.

Where a node identifier is included in a proximity indication message, a UE may need some means of determining the appropriate cell identifiers to include in such messages. In an embodiment, cell identifiers may be included in a "fingerprint" database that contains data regarding areas, cells, and/or the nodes that service areas and cells. For example, when a fingerprint database is updated on a UE as a result of autonomous cell search, node identifiers may be added to the database. Such identifiers may be those associated with H(e)NBs and other nodes proximate to the UE's current location, may be all available identifiers, or may be any subset of available identifiers selected using any criteria.

Alternatively, node identifiers may be added to a UE's white-list and corresponding CSGs may be stored in a UE's fingerprint database. This allows the fingerprint database and the white-list to be jointly used to retrieve an identifier of a node to be identified in a proximity indication message. Alternatively, node identifiers may be included in both the fingerprint database and the white-list. Any combination of these storage methods for storing node identifiers may be used, and all such embodiments are contemplated as within the scope of the present disclosure.

It may be desirable to determine that a UE has access rights to the cell(s) associated with the nodes identified in a proximity indication message. A UE may construct and/or update its fingerprint database records based on successful membership verification. Membership verification may be performed locally on the UE, by the network, or by both the UE and the network. Alternatively, the network may provide fingerprint records to a UE based on positive membership. When the membership status of a UE changes, the associated fingerprint record may be proactively updated to reflect the change. For example, if a UE ceases to be part of a CSG configured on an H(e)NB, then the H(e)NB identifier and/or related data may be removed from the UE's fingerprint database. Alternatively, the UE may be configured to prevent the inclusion of the identifier of such an H(e)NB in any proximity indication message.

In an embodiment, a UE may be configured to not transmit a proximity indication message including a particular identifier for a node until membership verification of the UE is performed for that node. The UE may perform such verification, or such verification may be performed by the network. Alternatively, both the network and the UE may perform such verification.

A UE may be configured to transmit proximity indication messages upon receiving an instruction to do so or upon detecting some trigger, rather than autonomously transmitting proximity indication messages. In such embodiments, where a UE is in connected mode, autonomous proximity indication reporting may be configured on a UE upon the UE detecting a node. If the UE is in idle mode, the UE may be configured to periodically transition to connected mode and autonomously transmit one or more proximity indication messages. Any criteria for determining when a UE may autonomously transmit proximity indication messages is contemplated as within the scope of the present disclosure.

Upon receiving a proximity indication message containing one or more node identifiers, a node, such as an H(e)NB, may be configured to interpret the message in various ways. In an embodiment, the detection of a node identifier in a proximity indication message may be interpreted by a node as an indication or request to turn on, power up, or otherwise instruct an H(e)NB to become active and available for a UE. After a UE sends such a message, the UE may be configured to automatically enter connected mode (or remain in connected mode if already in connected mode). Alternatively, the UE may remain in or return to idle mode. The node that received the message may activate the identified H(e)NB and transmit an instruction to the UE to perform measurement and implement handover of the UE to the H(e)NB.

If a UE that has sent one or more proximity indication messages fails to receive instructions to perform a handover, the UE may be configured to stop transmitting proximity indication messages with node identifiers after a predetermined and/or configurable number of attempts. Alternatively, a macro Node B may transmit an instruction to the UE to stop the transmission of proximity indication messages for CSG H(e)NBs or specific CSG H(e)NBs.

In addition to a node identifier, a UE may be configured to include a CSG identifier or identifiers in a proximity indication message. Additionally, or instead, a UE may be configured to include its membership status in a proximity indication message. Using this information, a macro Node B may make a decision about whether to activate one or more H(e)NBs, and which H(e)NBs are candidates for activation. Moreover, a macro Node B may use this information to make a decision to turn on the H(e)NBs using the X2 interface, the S1 interface, or the Iuh interface via the H(e)NB-GW. Alternatively, the H(e)NB-GW may make the decision to turn ON the H(e)NB using the Iuh interface.

Note that any of the methods and means disclosed herein may be combined or may be used in part. For example, a single H(e)NB may be configured to implement two or more of the methods illustrated in FIGS. 4-9, or any single aspect or several aspects of any of these methods. All such embodiments are contemplated as within the scope of the present disclosure.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of operating an eNode B by a radio network controller, comprising:
   determining, by a radio network controller of a first radio access technology (RAT), to increase inter-RAT cellular communication capacity;
   sending, to a first eNode B of a second RAT in a dormant state, a first instruction for a first activation of the first eNodeB of the second RAT based on the determination to increase inter-RAT cellular communication capacity, the first instruction including a predetermined time interval for a duration of the first activation, the first eNode B serving an area covered by the radio network controller, the first instruction causing the first eNodeB of the second RAT to activate for the predetermined time interval;
   determining to initiate a second activation of the first eNode B of the second RAT, the second activation of the first eNodeB of the second RAT not being limited by the predetermined time interval; and
   sending to the first eNodeB of the second RAT a second instruction for the second activation, the second instruction causing the first eNodeB of the second RAT to activate.

2. The method of claim 1, wherein the first instruction indicates that the first eNodeB of the second RAT activate for the predetermined time interval during a probing interval.

3. The method of claim 1, further comprising:
   sending, to a second eNodeB of the second RAT in a dormant state, a third instruction for a first activation of the second eNodeB of the second RAT for the predetermined time interval based on the determination to increase inter-RAT cellular communication capacity, the second eNodeB serving an area covered by the radio network controller, the third instruction causing the second eNodeB of the second RAT to activate for the predetermined time interval; and
   determining to not initiate a second activation of the second eNodeB of the second RAT.

4. The method of claim 3, further comprising:
   receiving, from at least one wireless transmit/receive unit (WTRU), an indication of a lack of communication capability with the second eNodeB of the second RAT, wherein the determining to not initiate a second activation of the second eNodeB of the second RAT is based at least on the indication.

5. The method of claim 1, further comprising:
   receiving, from at least one wireless transmit/receive unit (WTRU), an indication of communication capability with the first eNodeB of the second RAT, wherein the determining to initiate the second activation of the first eNodeB of the second RAT is based at least on the indication.

6. The method of claim 1, wherein the first instruction indicates that the first eNodeB of the second RAT transmit a first reference signal at some time during the predetermined time interval.

7. The method of claim 6, further comprising:
   receiving a measurement of the first reference signal from at least one wireless transmit/receive unit (WTRU).

8. The method of claim 7, wherein the determining to initiate the second activation of the first eNodeB of the second RAT is based at least on the measurement.

9. A radio network controller of a first radio access technology (RAT), comprising:
   a processor configured to:
     determine to increase inter-RAT cellular communication capacity;
     send, to a first eNode B of a second RAT in a dormant state, a first instruction for a first activation of the first eNodeB of the second RAT based on the determination to increase inter-RAT cellular communication capacity, the first instruction including a predetermined time interval for a duration of the first activation, the first eNode B serving an area covered by the radio network controller and the first instruction causing the first eNodeB of the second RAT to activate for the predetermined time interval;
     determine to initiate a second activation of the first eNode B of the second RAT, the second activation of the first eNodeB of the second RAT not being limited by the predetermined time interval; and
     send to the first eNodeB of the second RAT a second instruction for the second activation, the second instruction causing the first eNodeB of the second RAT to activate.

10. The radio network controller of claim 9, wherein the processor is further configured such that the first instruction indicates that the first eNodeB of the second RAT activate for the predetermined time interval during a probing interval.

11. The radio network controller of claim 9, wherein the processor is further configured to:
send, to a second eNodeB of the second RAT in a dormant state, a third instruction for a first activation of the second eNodeB of the second RAT for the predetermined time interval based on the determination to increase inter-RAT cellular communication capacity, the second eNodeB serving an area covered by the radio network controller, the third instruction causing the second eNodeB of the second RAT to activate for the predetermined time interval; and
determine to not initiate a second activation of the second eNodeB of the second RAT.

12. The radio network controller of claim 11, wherein the processor is further configured to receive, from at least one wireless transmit/receive unit (WTRU), an indication of a lack of communication capability with the second eNodeB of the second RAT, wherein the determining to not initiate a second activation of the second eNodeB of the second RAT is based at least on the indication.

13. The radio network controller of claim 9, wherein the processor is further configured to receive, from at least one wireless transmit/receive unit (WTRU), an indication of communication capability with the first eNodeB of the second RAT, wherein the determining to initiate the second activation of the first eNodeB of the second RAT is based at least on the indication.

14. The radio network controller of claim 13, wherein the processor is further configured such that the first instruction indicates that the first eNodeB of the second RAT transmit a first reference signal at some time during the predetermined time interval.

15. The radio network controller of claim 14, wherein the processor is further configured to:
receive a measurement of the first reference signal from at least one wireless transmit/receive unit (WTRU); and
initiate the second activation of the first eNodeB of the second RAT is based at least on the measurement.

* * * * *